(12) United States Patent
Maciel (10) Patent No.: US 11,944,872 B1
(45) Date of Patent: Apr. 2, 2024

(54) CLIMBING APPARATUS FOR CLIMBING A TALL STRUCTURE

(71) Applicant: Charles Maciel, Scarborough (CA)

(72) Inventor: Charles Maciel, Scarborough (CA)

(*) Notice: Subject to any disclaimer, the term of this patent is extended or adjusted under 35 U.S.C. 154(b) by 883 days.

(21) Appl. No.: 17/009,948

(22) Filed: Sep. 2, 2020

(51) Int. Cl.
| | | |
|---|---|---|
| *A63B 27/00* | (2006.01) | |
| *A01G 23/099* | (2006.01) | |
| *E04G 3/28* | (2006.01) | |
| *E04G 3/32* | (2006.01) | |

(52) U.S. Cl.
CPC ............ *A63B 27/00* (2013.01); *A01G 23/099* (2013.01); *E04G 3/32* (2013.01); *E04G 2003/286* (2013.01)

(58) Field of Classification Search
CPC ............ A63B 27/00–04; A01G 23/099; A01G 23/08; A01G 23/0955; E04G 3/32; E04G 2003/286; B27L 1/00
USPC ...................................................... 144/24.13
See application file for complete search history.

(56) References Cited

U.S. PATENT DOCUMENTS

| | | | |
|---|---|---|---|
| 6,474,377 B1 | 11/2002 | Van De Mortel | |
| 7,997,311 B2 | 8/2011 | Prout | |

FOREIGN PATENT DOCUMENTS

| | | | |
|---|---|---|---|
| CN | 114375794 | * | 10/2020 |
| JP | 2002315453 | * | 4/2001 |

* cited by examiner

*Primary Examiner* — Jimmy T Nguyen
*Assistant Examiner* — Smith Oberto Bapthelus
(74) *Attorney, Agent, or Firm* — Sanchelima & Associates, P.A.; Christian Sanchelima; Jesus Sanchelima (57) ABSTRACT

A system for a climbing apparatus including a housing assembly, a wheel assembly, a lock assembly, a rope assembly and a chainsaw assembly is disclosed. The housing assembly includes a housing having a rope wheel therein. The housing is mounted to a chainsaw to power the components within the housing to allow a user to ascend and descend a structure. The rope is secured to the top of a structure and then mounted to the rope wheel at an opposite end. The chainsaw is actuated to also actuate rope assembly. The rope wheel rotates to allow for rope to be fed, allowing a user attached to the housing to ascend or descend, as needed. With the lever the user may lock the rope in place to allow the user to work at a desired height on a structure.

20 Claims, 6 Drawing Sheets

CLIMBING APPARATUS FOR CLIMBING A TALL STRUCTURE

BACKGROUND OF THE INVENTION

1. Field of the Invention

The present invention relates to a climbing apparatus and, more particularly, to a climbing apparatus that is used for climbing poles, trees, and other tall structures in an efficient, safe and quick manner.

2. Description of the Related Art

Several designs for a climbing apparatus have been designed in the past. None of them, however, include a tree climbing device for use with a palm tree comprising a length of rope, a motorized, wheeled tree climbing device having a rope holding hook, and a harness having a rope feeding device for elevating and lowering the user in a safe manner. For example, palm trees or coconut trees are grown for variety of reasons including, but not limited to, landscaping, coconuts, and so on. Palm trees typically have a trunk with a crown at the top comprising a plurality of palm fronds. In some cases, the crown of the palm trees reaches a height of sixty feet or more. As the tree grows, the palm fronds need to be removed, leaving the trunk covered with palm wrappings. As known, the palm trees need maintenance depending on the type of palm tree and/or the use of the palm tree. The most common forms of palm tree maintenance are stripping the wrapping from the trunk and trimming the palm fronds off of the tree. In order to trim the palm fronds, traditionally a maintenance person needs to climb the palm tree. As known, it is very risky for the maintenance person to climb the tree, as a fall from such height may result in serious injury to the maintenance person. Additionally, a person may need to climb trees for the collection of fruits. Collecting the fruits makes the climber prone to serious injuries and even death as a fall from such a height may be disastrous. This is one example in which the present invention may be used, however, it should be understood that any tall structure can be climbed with the present invention to complete different necessary tasks.

Applicant believes that a related reference corresponds to U.S. Pat. No. 7,997,311 for a self-propelled climbing apparatus for stripping, trimming and coating palm trees. Applicant believes that another related reference corresponds to U.S. Pat. No. 6,474,377 for a self-propelled climbing tree trimmer. None of these references, however, teach of a device including a rope, a motorized housing that has a rope holding hook, and a harness having a rope feeding device for elevating and lowering the user in a safe manner to allow the user to complete required tasks.

Other documents describing the closest subject matter provide for a number of more or less complicated features that fail to solve the problem in an efficient and economical way. None of these patents suggest the novel features of the present invention.

III. SUMMARY OF THE INVENTION

It is one of the objects of the present invention to provide a climbing apparatus that allow a user to ascend and descend tall structures in a quick and controlled manner.

It is another object of this invention to provide a climbing apparatus that increases the safety of the user by providing securing means that are reliable and durable.

It is still another object of the present invention to provide a climbing apparatus that can be retrofitted onto existing chainsaws.

It is another object of the present invention to provide a climbing apparatus that is easily operated and even repaired.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

IV. BRIEF DESCRIPTION OF THE DRAWINGS

With the above and other related objects in view, the invention consists in the details of construction and combination of parts as will be more fully understood from the following description, when read in conjunction with the accompanying drawings in which.

V. DETAILED DESCRIPTION OF THE EMBODIMENTS OF THE INVENTION

Referring now to the drawings, where the present invention is generally referred to with numeral 10, it can be observed that it, climbing apparatus 10, basically includes a housing assembly 20, a wheel assembly 40, a lock assembly 60, a rope assembly 80, and a chainsaw assembly 100.

Climbing apparatus 10 facilitates the ascending and descending of structures that may be of a significant height. Further, the present invention aids to increase the safety of the climber while climbing. With climbing apparatus 10 the climber may also stop at predetermined heights on the structure to complete necessary work at different needed heights. Additionally, climbing apparatus 10 may be retrofitted onto existing equipment, such as chainsaws that a user may already own or chainsaws that already exist.

Figure 3:
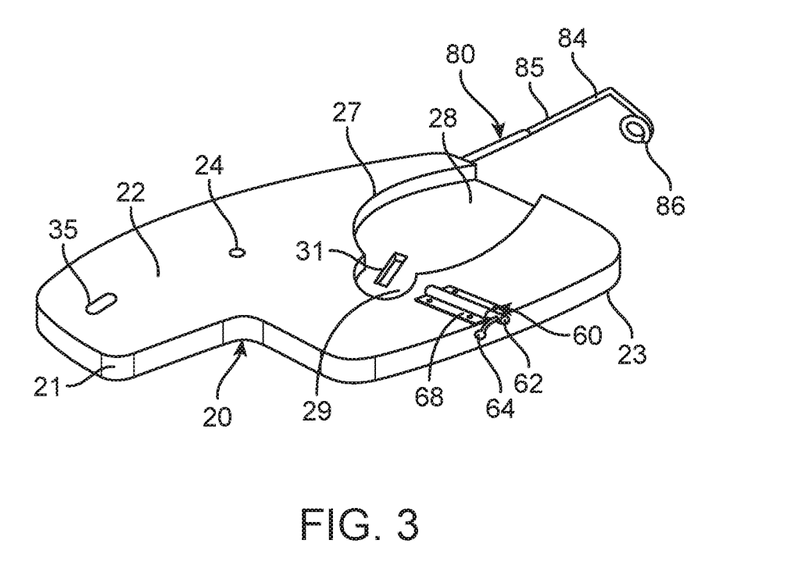
FIG. 3 illustrates an isometric view of the housing 20.
Figure 4:
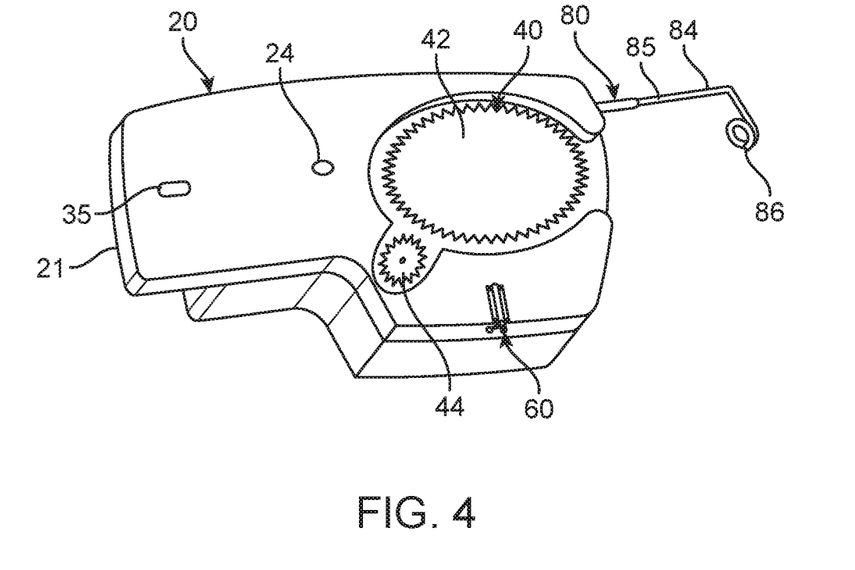
FIG. 4 is a representation of the climbing apparatus 10 being mounted to the chainsaw 102 of the chainsaw assembly 100 with wheel assembly 40 within.

Climbing apparatus 10 may include housing assembly 20. Housing assembly 20 may include a housing 21. Housing 21 may include a top side 22 and a bottom side 23. It is to be understood that housing 21 may be mounted onto a chainsaw 102 of chainsaw assembly 100. Chainsaw 102 may include a chainsaw sprocket 104 that is to engage and cooperate with climbing apparatus 10 to provide power to the present invention. When housing 21 is mounted to chainsaw 102, top side 22 may face outwardly towards the user or climber. Bottom side 23 may face towards chainsaw 102. Chainsaw 102 may be any preexisting chainsaw.

It should be understood that housing 21 may enclose or house various components of wheel assembly 40, lock assembly 60 and rope assembly 80 therein. Housing 21 may be of a predetermined shape and dimensions that cooperates with fitting onto chainsaw 102. Preferably, housing 21 may avoid covering the exhaust on chainsaw 102 to prevent damage to chainsaw 102. It may be suitable for housing 21 to be made of plastic, aluminum, rubber, stainless steel, other similar materials or combinations thereof.

Housing 21 may include a securing opening 24 that may be used to securely mount housing 21 to chainsaw 102. Securing opening 24 may be centrally located on housing 21. In one embodiment, securing opening 24 may be threaded. A faster 25 may extend through securing opening 24 to secure housing 21 to chainsaw 102. It may also be suitable to secure housing 21 and chainsaw 102 together with fasteners, adhesives, pins, screws or other similar means that cooperate with securing opening 24.

On bottom side 23, housing 21 may include a housing sprocket 26. Housing sprocket 26 may engage chainsaw 102. Housing sprocket 26 and chainsaw sprocket 104 may be interconnected with gears and chains as known in the art. It is to be understood that different chainsaws may require different gear ratios to allow the present invention being operation when retrofitted onto different chainsaws with different configurations. The interconnection of housing sprocket 26 and chainsaw sprocket 104 underneath of housing 21 may allow energy generated by chainsaw 102 to be transferred to climbing apparatus 10 for providing sufficient power to the present invention.

On top side 22 may be a cavity 27. Cavity 27 may substantially house wheel assembly 40 therein. Cavity 27 may be of an irregular shape. It is to be understood that cavity 27 may be of a predetermined height that permits wheel assembly 40 to fit flushly therein. Cavity 27 may preferably be covered during usage of climbing apparatus 10. Cavity 27 may be further defined by a first cavity 28 and a second cavity 29. First cavity 28 and second cavity 29 may be adjacent to each other. It is to be understand that first cavity 28 and second cavity 29 may be in constant abutting contact. Preferably, first cavity 28 may be larger than second cavity 29. Each of first cavity 28 and second cavity 29 may cooperate with different components of wheel assembly 40. Each of first cavity 28 and second cavity 29 may be circular in shape.

Within second cavity 29 may be a slot 31. Slot 31 may have a length and a width. The length of slot 31 may be greater than the width as slot 31 may preferably be rectangular. Slot 31 may be used to allow components of wheel assembly 40 to slide and move within second cavity 29 along the length of slot 31.

Figure 8:
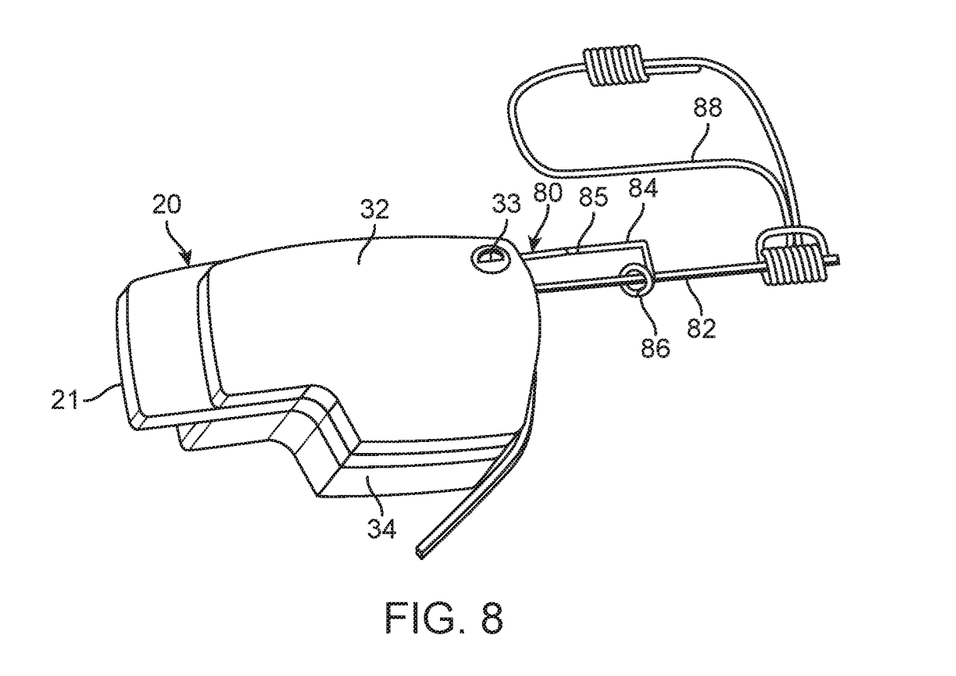
FIG. 8 is a representation of housing assembly 20 in the closed configuration with lid 32 selectively concealing cavity 27.

It is to be understood that cavity 27 may be covered by a lid 32 while the present invention is in use. Lid 32 may have a closed or open configuration to seal or expose cavity 27, respectively. Lid 32 may be hingely mounted to top side 22 of housing 21. It may be suitable for lid 32 to be mounted on a peripheral side of cavity 27. Lid 32 may be mounted with hinges, or the like onto housing 21. It may be suitable for lid 32 to have a domed shape, in one embodiment. It may be suitable for cavity 27 to have a width less than that of lid 32. It may be suitable for lid 32 to be held closed with a lid lock 33. Lid lock 33 may be a spring lock, in one embodiment. It may be suitable for lid lock 33 to include a male member and female member. The male member may extend and protrude through lid 32. The female member may be on housing 21. The female member may receive and engage the male member to lock lid 32.

Figure 2:
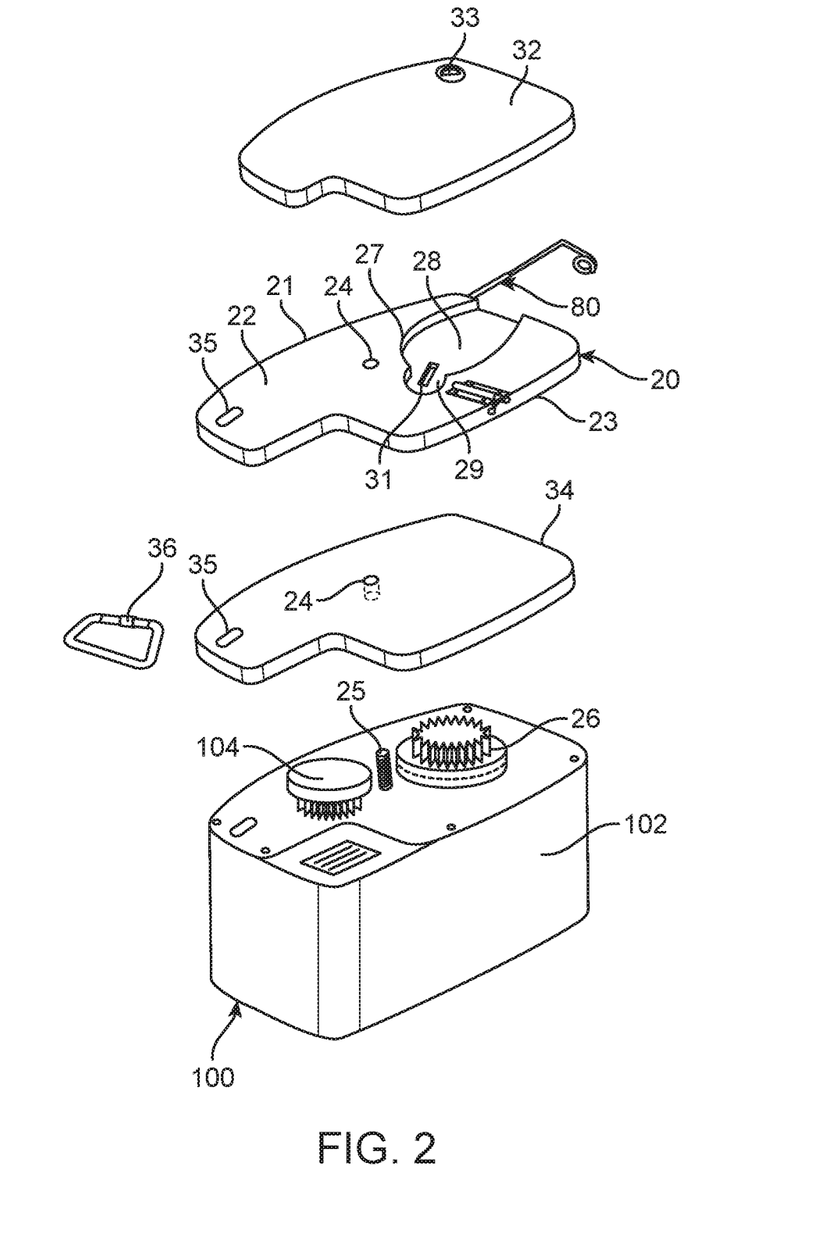
FIG. 2 shows an exploded view of the climbing apparatus 10.

Housing assembly 20 may further include a cover skirt 34. Cover skirt 34 may be located between housing 21 and chainsaw 102. Cover skirt 34 may drape between housing 21 and chainsaw 102. Cover skirt 34 may help to protect moving components of the present invention. Additionally, housing assembly may include a carabineer opening 35 that is to receive a carabiner 36. Carabiner 36 may be attached to user for added safety and security.

Figure 9:
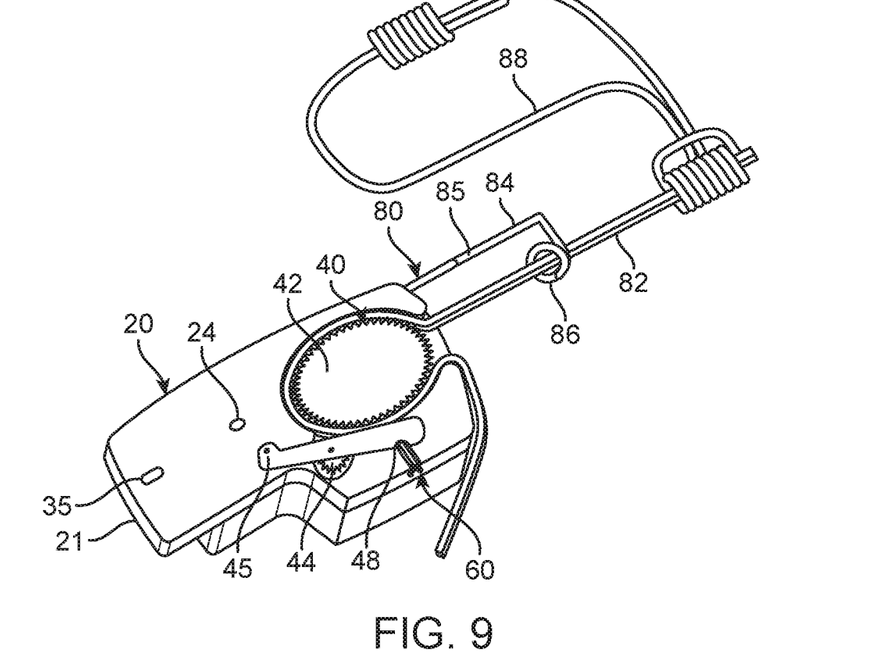
FIG. 9 represents an isometric view of housing assembly 20 with wheel assembly 40, lock assembly and rope assembly 80 secured thereto.

It is to be understood that within housing 21 may be housed wheel assembly 40. Wheel assembly 40 may include a rope wheel 42 and a roller blade wheel 44. More specifically, rope wheel 42 may be received within first cavity 28 and roller blade wheel 44 may be received within second cavity 29. Rope wheel 42 may have a thickness that matches that of first cavity 28, to fit flushly therein. Roller blade wheel 44 may be have a thickness that cooperates with second cavity 29 to fit flushly therein. Rope wheel 42 and roller blade wheel 44 may interact with each other during operation of climbing apparatus 10. Rope wheel 42 may receive a rope 82 from the rope assembly 80. Rope 82 may extend partially along the perimeter of rope wheel 42. To prevent rope 82 from continuing to move about rope wheel 42, rope 82 may be pressed against with roller blade wheel 44. To engage rope 82 with roller blade wheel 44, a lever 46 may be mounted and secured atop of roller blade wheel 44. Lever 46 may be L shaped in one embodiment. Lever 46 may be used to actuate roller blade wheel 44. Lever 46 may be used to move roller blade wheel 44 along slot 31 towards and away from rope wheel 42 as needed. Lever 46 may include a lock slot 48 near a distal end away from roller blade wheel 44. Lock slot 48 may be used to cooperate with a lock assembly 60.

Figure 6:
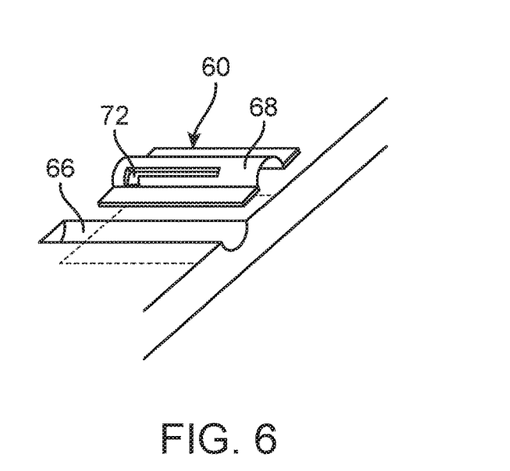
FIG. 6 shows a zoomed in view of lock assembly 60.

Climbing apparatus 10 may include lock assembly 60 to cooperate with lever 46 to allow or prevent the user from ascending with the present invention. Lock assembly 60 may be located on a lateral side of housing 21. Lock assembly 60 may include a lock member 62 with a grip member 64 extending outwardly and away from lock member 62. In one embodiment, lock member 62 may be cylindrical in shape. It may be suitable for lock member 62 to be made of materials such as plastic, metal, rubber, stainless steel or combinations thereof. Grip member 64 may include a ball at a distal end thereof. Grip member 64 may facilitate grasping and operating of lock member 62. Lock member 62 may be received within a lock channel 66. Lock member 62 may preferably be longer than lock channel 66 is. It is to be understood that grip member 64 may be above of lock channel 66 to allow grasping thereof. The user may grasp grip member 64 to slide lock member 62 back and forth within lock channel 66. The distal end of lock member 62 may cooperate with lock slot 48 to lock lever 46 in place to prevent rope wheel 42 from continuing to spin to prevent the ascend or descend of the user with the present invention. In one embodiment, there may be a lock cover 68 mounted over lock member 62 and lock channel 66. Lock cover 68 may help to keep lock member 62 secured in place and prevent accidental operation thereof. Lock cover 68 may include a lock opening 72. Lock opening 72 may preferably be L shaped. From lock opening 72 may extend grip member 64. Lock opening 72 may extend substantially along the length of lock cover 68. Grip member 64 may slide along lock opening 72 when lock assembly is being operated. Lock opening 72 may include a holding portion to receive grip member 64 when lock member 62 needs to be locked into lock slot 48.

Figure 5:
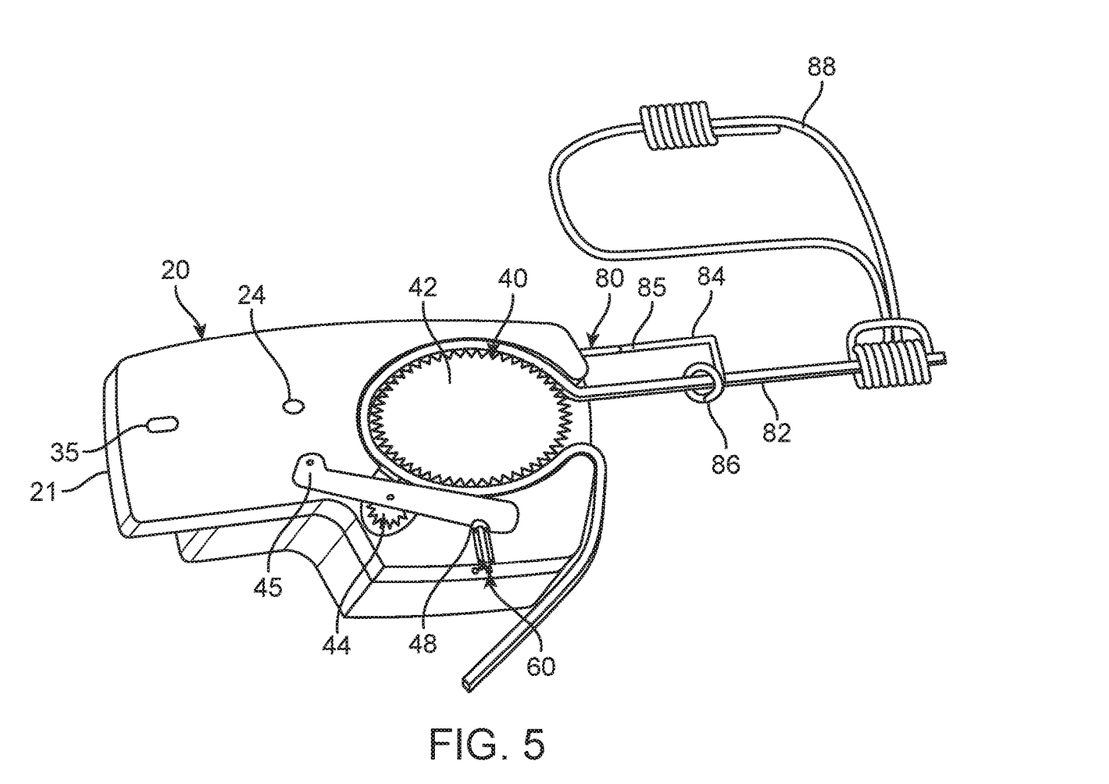
FIG. 5 represents an isometric view of rope assembly 80 secured to housing assembly 20.
Figure 7:
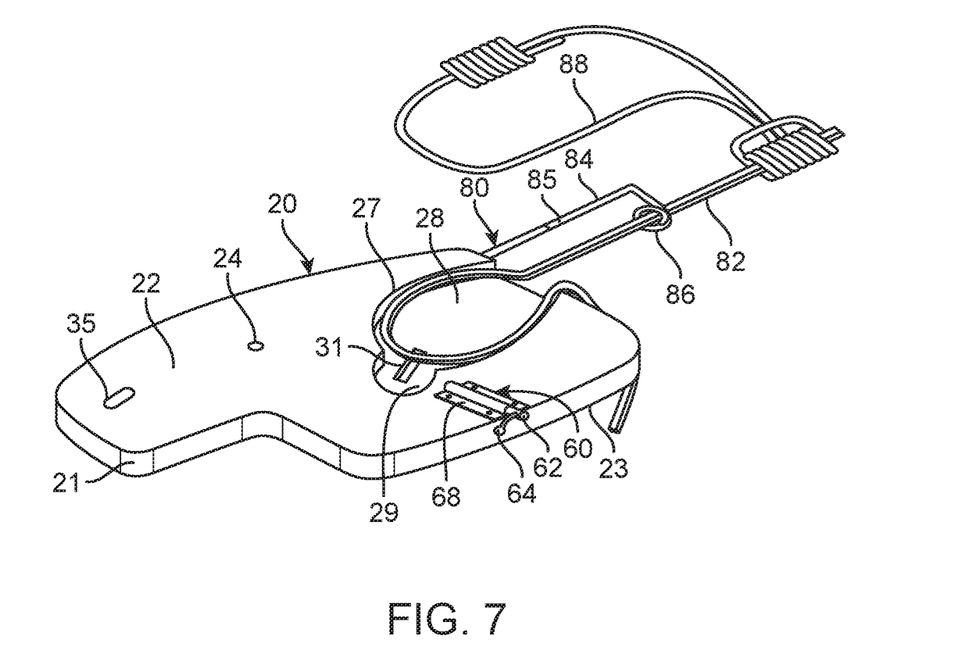
FIG. 7 illustrates another isometric view of housing assembly 20 with rope assembly 80 attached thereto.

To allow the user to climb a structure T, climbing apparatus 10 may include a rope assembly 80. Structure T may be a building or tree, for example. Rope assembly 80 may include a rope 82. Rope 82 may be of a predetermined length long enough to permit extending the entire height of structure T. One distal end of rope 82 may remain on a ground surface, while the opposite distal end of rope 82 may be secured to the top of structure T that is to be ascended. Mounted to housing 21 may be a rope guide 84. Rope guide 84 may be mounted to a peripheral side of housing 21. Rope guide 84 may help to keep rope 82 tangle free and moving properly in and out of housing 21. Rope guide 84 further helps to protect rope 82 from getting caught onto objects of structure T during ascending or descending. Rope guide 84 may include a shaft 84 and a loop 85. Rope 82 may be parallel to shaft 84. Rope 82 may extend through loop 85. It is to be understood that loop 85 may be perpendicular to shaft 84. Rope assembly 80 may further include a safety rope 88. It may be preferable for safety rope to be secure onto rope 82 and above of rope guide 84. The rope assembly 80 may further include ascenders 92. Ascenders 92 may help to ascend structure T to secure rope 82 to the top of structure T. Ascenders 92 may include wheels 93 to help move up and down structure T with ease.

Figure 10:
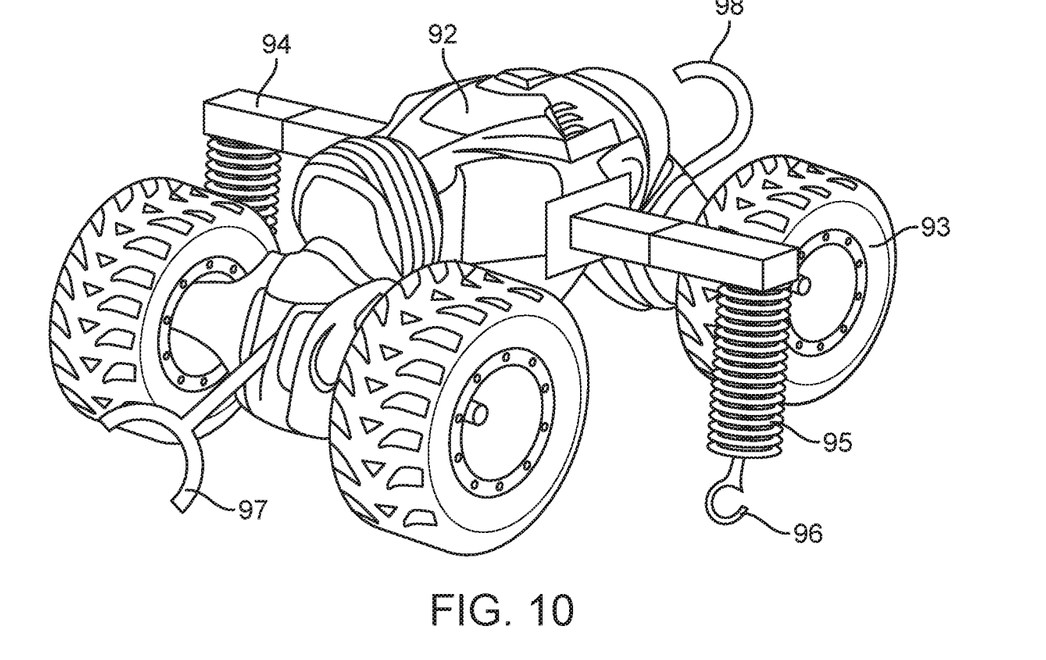
FIG. 10 shows an isometric view of one of ascenders 92.

Extending from lateral sides of each of ascenders 92 may be side arms 94. It may be suitable for side arms 94 to be telescopic to adjust in length. Side arms 94 may extend outwardly and away from ascenders 92. Extending from each of side arms 94, may be one of springs 95. Springs 95 may expand and compress. At a distal end of each of springs 95 may be a clamp 96. It is to be understood that ascenders 92 may be interconnected to ascend structure T. Springs 95 and clamp 96 may be assist in interconnecting ascenders 92 together. Clamp 96 of each of spring may be attached together. This allows ascenders 92 to be on at least two sides of structure T. Springs 95 may then extend about the remaining perimeter of structure T.

Ascenders 92 may each further include a rope hook 97 and an arm 98. Rope hook 97 may preferably be mounted at a rear end of each of ascenders 92. Rope hook 97 allow for rope 82 to be carried to the top of structure T. Rope hook 97 further permits for rope 82 to be extended about the perimeter of structure T. Arm 98 may preferably be mounted to the front end of each ascenders 92. Arm 98 may help keep obstructions out of the way as ascenders 92 as structure T is ascended by ascenders 92.

Figure 1:
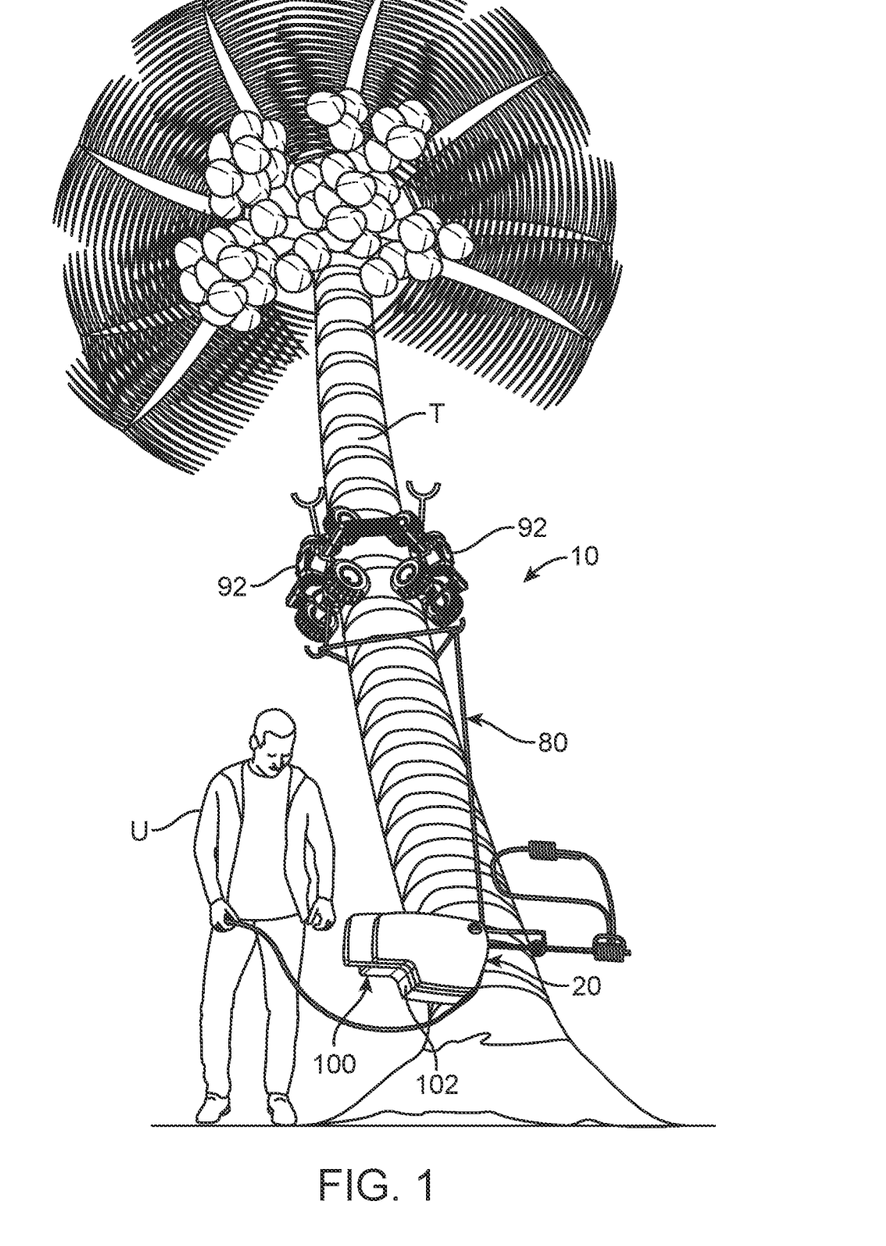
FIG. 1 represents the climbing apparatus 10 being used by a user U to climb up a tall structure 122, such as tree T, for example.

The present invention may allow the user to ascend and descend safely and efficiently. User U properly sets the rope at the top of structure T before usage with rope assembly 80. Then housing assembly 20 is mounted to chainsaw 102. Once chainsaw 102 is actuated, then so is wheel assembly 40. With the power of chainsaw 102 the present invention may be powered. User may engage and operate chainsaw 102 to begin to ascent tall structure 102. Preferably, chainsaw 102 is without a blade, to avoid injuries.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for a climbing apparatus, comprising:
   a) a chainsaw assembly including a chainsaw with a chainsaw sprocket;
   b) a structure;
   c) a housing assembly including a housing having a top side and a bottom side, said housing secured to said chainsaw, said housing including a housing sprocket on said bottom side that is attached and interconnected with said chainsaw;
   d) a wheel assembly including a rope wheel and a roller blade wheel, said chainsaw sprocket interacting with said housing sprocket to rotate said rope wheel when said chainsaw is actuated; and
   e) a rope assembly including a rope, said rope secured to a top of said structure, said rope fed through said housing about said rope wheel, said rope extending outwardly from said housing, said rope wheel rotating to feed said rope through said housing to cause said housing to ascend along said structure upon said chainsaw being actuated, said roller blade wheel engaging said rope wheel to selectively cease ascending of said structure.

2. The system of claim 1, wherein said housing includes a securing opening to receive a fastener to secure said housing to said chainsaw.

3. The system of claim 2, wherein a cover skirt extends between said housing and said chainsaw, said cover skirt concealing said chainsaw sprocket and said housing sprocket.

4. The system of claim 3, wherein said cover skirt includes an additional of said securing opening to allow said cover skirt to be secured between said housing and said chainsaw with said fastener.

5. The system of claim 3, wherein said housing and said cover skirt include a carabiner opening, a carabiner attached to said carabiner opening.

6. The system of claim 1, wherein said housing includes a cavity on said top side, said cavity further defined by a first cavity and a second cavity, said rope wheel secured within said first cavity, said roller blade wheel secured within said second cavity.

7. The system of claim 6, wherein said first cavity and said second cavity are adjacent to each other, said first cavity and said second cavity being in constant abutting contact with each other.

8. The system of claim 6, wherein said second cavity includes a slot extending therethrough, said roller blade wheel secured to said slot.

9. The system of claim 8, wherein a lever is secured to said roller blade wheel, said lever being engaged to move said roller blade wheel to move towards and away from said rope wheel with said slot.

10. The system of claim 9, wherein said lever includes a lock slot.

11. The system of claim 10, wherein a lock assembly including a lock member with a grip member is secured within a lock channel on said housing, said lock member being slidable within said lock channel, said lock member interacting with said lock slot to interlock said rope wheel and said roller blade wheel to prevent movement of said rope, said rope sandwich between said rope wheel and said roller blade when said lever is locked in place.

12. The system of claim 11, wherein a lock cover is secured over said lock member and said lock channel, said lock cover including a lock member opening, said grip member protruding through said lock member opening allowing said lock member to be engaged to be slide within said channel to lock or release said lever.

13. The system of claim 1, wherein a lid is secured to housing at said top side, said lid selectively covering said rope wheel and said roller blade wheel.

14. The system of claim 13, wherein said lid includes a lid lock to secure said lid in a closed position.

15. The system of claim 1, wherein a rope guide is secured to said housing, said rope guide including a shaft and a loop, said rope extending adjacently to said shaft and through said loop.

16. The system of claim 1, wherein a safety rope is secured to said rope.

17. The system of claim 1, wherein ascenders with wheels ascend said structure to secure said rope to the top of said structure.

18. The system of claim 17, wherein said ascenders include sidearms, springs extend from said sidearms, said springs each include clamps, said clamps interconnecting said ascenders together to allow said ascenders to ascend or descend said structure simultaneously.

19. The system of claim 17, wherein said ascenders further include rope hooks at a rear end thereof, said rope hooks securing said rope to said ascenders.

20. The system of claim 17, wherein said ascenders include arms at a front end thereof, said arms clearing obstructions encountered as said ascenders climb said structure.

\* \* \* \* \*